United States Patent [19]

Autie et al.

[11] Patent Number: 4,858,721
[45] Date of Patent: Aug. 22, 1989

[54] ACOUSTIC PANEL FOR SOUND INSULATING LININGS OF GAS DUCTS

[75] Inventors: Pascal J. M. Autie, Paris; Philippe P. Avignon, Combs-la-Ville; Dominique P. Camusso, Evry; Alexandre Forestier, Melun; Gilles Ulryck, Ballancourt, all of France

[73] Assignee: Societe Nationale d'Etude et de Construction de Moteurs d'Aviation, 03, Pa.RIS ; FRX

[21] Appl. No.: 177,130

[22] Filed: Apr. 4, 1988

[30] Foreign Application Priority Data

Apr. 8, 1987 [FR] France ............... 87 04908

[51] Int. Cl.⁴ .................. B64D 33/00; E04B 1/82
[52] U.S. Cl. ....................... 181/213; 181/214; 181/224; 181/286
[58] Field of Search ............ 181/213, 214, 221, 286, 181/288, 292, 293

[56] References Cited

U.S. PATENT DOCUMENTS

| 4,258,823 | 3/1981 | Ganz et al. | 181/214 |
| 4,433,751 | 2/1984 | Bonneau | 181/286 X |
| 4,449,607 | 5/1984 | Forestier et al. | 181/213 |
| 4,452,335 | 6/1984 | Mathews et al. | 181/214 |
| 4,751,979 | 6/1988 | Wiseman | 181/213 |

FOREIGN PATENT DOCUMENTS 0057621 8/1982 France .

Primary Examiner—B. R. Fuller
Attorney, Agent, or Firm—Oblon, Fisher, Spivak, McClelland & Maier

[57] ABSTRACT

A sound insulating lining for a gas flow path, particularly the bypass flow path in a jet engine, is made up of a succession of acoustic panels including a perforated skin bonded to a stiffening frame, and a cellular structure formed by a ribbed skin clamped with prestressing via of resilient tongues to transverse struts of the stiffening frame so that the ribs engage the perforated skin to form resonant acoustic cavities. The panels forming the lining are screwed to the casing constituting the wall of the flow path to be insulated.

6 Claims, 4 Drawing Sheets

ACOUSTIC PANEL FOR SOUND INSULATING LININGS OF GAS DUCTS

BACKGROUND OF THE INVENTION

1. Field of the Invention

The invention relates to the formation of sound insulating linings for gas ducts such as, for example, the secondary flow paths of bypass jet engines for aircraft.

Jet engines give rise to numerous sources of noise during their operation and FIG. 1 shows, relative to the axis of a jet engine, the directional pattern of the various sound waves which are generated.

A first noise source is the internal noise which is generated by the combustion and the expansion of hot gases through the turbine, and which is emitted as a beam 1 directed downstream of the engine.

A second noise source is the jet noise 2, which is also directed downstream of the engine and is generated in the zone where the gas flows mix and where turbulence is very considerable by virtue of the substantial differences in velocity between the flows (i.e. hot flow and cold flow, cold flow and ambient air).

Another noise source is that caused by the medium pressure compressor, and in this case the noise 3 is directed upstream of the engine.

Finally, a further source of noise is created by the fan disposed in the bypass flow. The fan noise propagates as two lobes 4 and 5, one directed in front of the engine, and the other directed downstream. Although at a level slightly below the jet noise, the fan noise has the drawback that its propagation lobes are very widely spread laterally relative to the aircraft.

2. Description of the prior art.

The imposition of regulations to reduce noise levels in the vicinity of airports has led to a very close interest being taken in the means for reducing the fan generated noise. One of these means consists of using on the inner part of the outer cold flow casing coatings of porous materials of good absorbing quality or sound insulating linings with Helmholtz resonators.

In the latter case it has already been proposed in U.S. Pat. No. 4,449,607 to construct a sound insulating lining on the wall of a gas flow path, the lining comprising a plurality of thin perforated panels which overlap end to end like tiles and, between the wall and each of the perforated panels, an intermediate layer designed to define with the perforated panel a plurality of resonant acoustic cavities having acoustic vents formed by the holes of the perforated panel, each panel being fixed directly to the wall by screws located through struts, and holding the intermediate layer between itself and the wall.

Such a lining, though very efficient, suffers nevertheless from the drawback of being relatively complicated to make and to assemble, as requires making complicated struts and washers, which must be adhesively bonded to opposite sides of the perforated panels.

SUMMARY OF THE INVENTION

The present invention seeks to simplify the manufacture and the assembly of sound insulating lining of the type described above, and to improve their behavior in use by creating, on assembly, a degree of prestressing which will suppress the vibrations to which the above known linings could be subjected.

To this end, according to the invention there is provided an acoustic panel for a sound insulating lining to be applied to the wall of a gas flow path, said panel comprising an inner skin provided with a multiplicity of perforations, an elongate stiffening frame bonded to said inner skin, said frame being arcuately curved in the longitudinal direction thereof and including transverse struts across the width of said frame, said struts having thinned portions at predetermined positions thereon, and a cellular structure mounted on said inner skin to define a plurality of resonant acoustic cavities for which said perforations of said inner skin form acoustic vents, said cellular structure comprising a ribbed skin wherein the ribs thereof extend in said longitudinal direction and are arcuately curved with a natural radius of curvature different from that of said inner skin, said ribbed skin having at least one pair of resilient tongues which clip under said thinned portions of said transverse struts of said frame to attach said ribbed skin to said inner skin whereby said ribs engage said inner skin to form said resonant cavities.

Preferably the ribbed skin is formed by a thin sheet of polymer resin carrying said curved ribs, said thin sheet having hollow moulded recesses with cut-out portions to define said resilient tongues.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
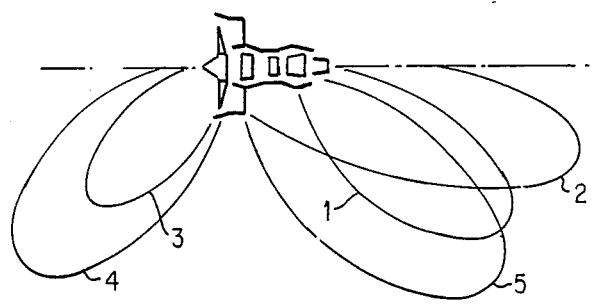
FIG. 1 is a diagram illustrating the extent of the various noise fronts emitted by a bypass jet engine, as hereinbefore described.
Figure 3:
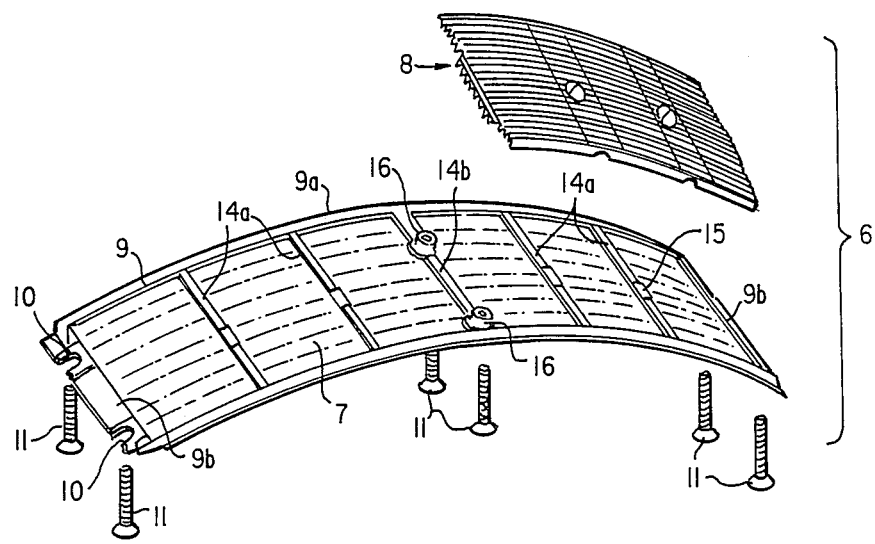
FIG. 3 is an exploded perspective view of the constituent parts of one embodiment of an acoustic panel in accordance with the invention.

Referring to FIG. 3, an acoustic panel 6 in accordance with the invention for forming a sound insulating lining comprises a multi-perforate inner skin 7 of moulded polymer resin reinforced with mineral or organic fibres, and a cell forming structure 8 which fits onto the skin 7.

The skin 7 is adhesively fixed to (or is moulded integrally with) an elongate stiffening frame 9 which is arcuately curved in its longitudinal direction 9a.

Figure 2:
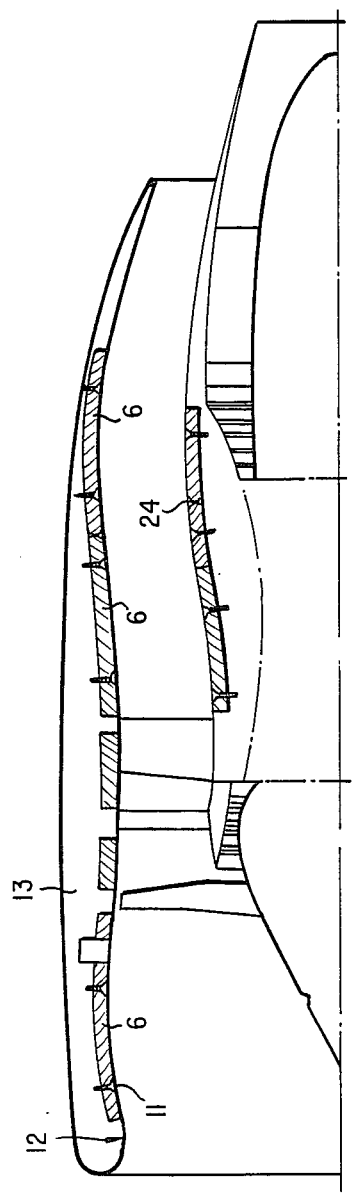
FIG. 2 is a diagrammatic longitudinal section of part of a bypass jet engine showing the regions of the outer casing on which it is possible to arrange sound insulating linings in accordance with the invention.
Figure 4:
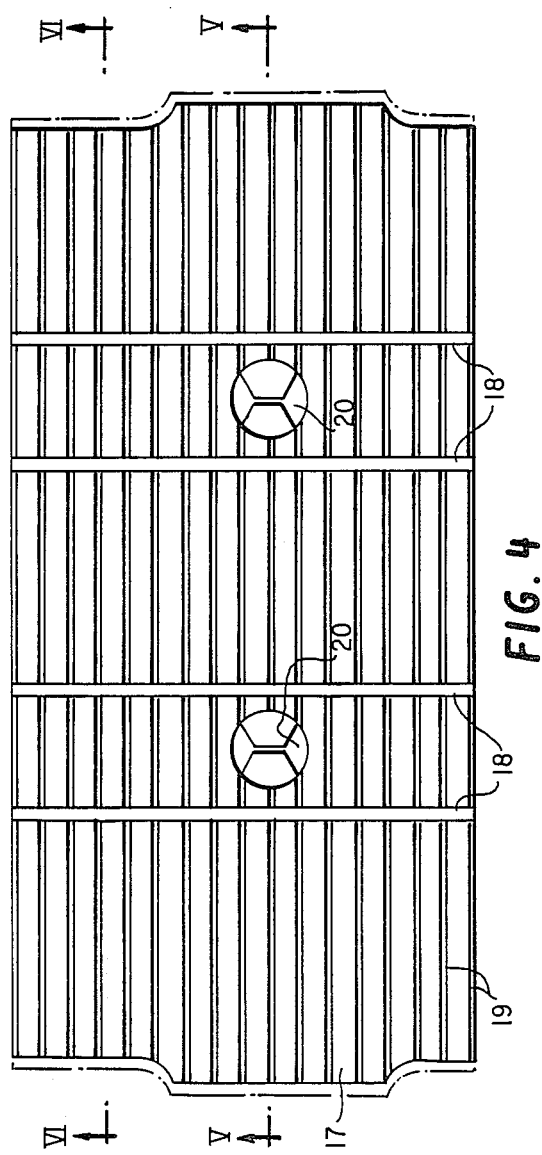
FIG. 4 is a plan view, in the direction of arrow F in FIG. 5, of the ribbed skin forming the cellular structure of the panel shown in FIG. 3.
Figure 8:
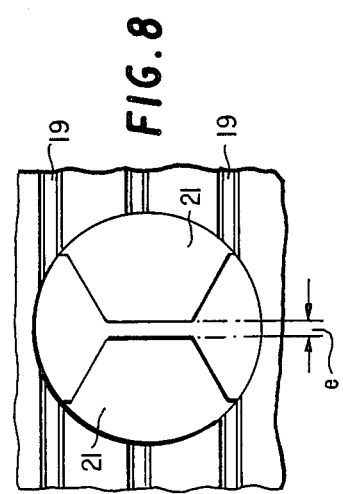
FIG. 8 is a plan view of the detail A shown in FIG. 7, viewed from above in the direction of arrow F1 in FIG. 5.
Figure 7:
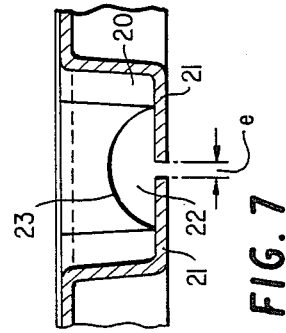
FIG. 7 shows, to a larger scale, the detail A indicated in FIG. 5.
Figure 5:
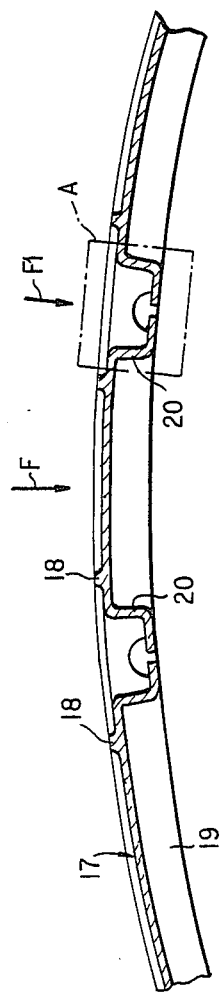
FIG. 5 is a section along the line V—V in FIG. 4.
Figure 6:
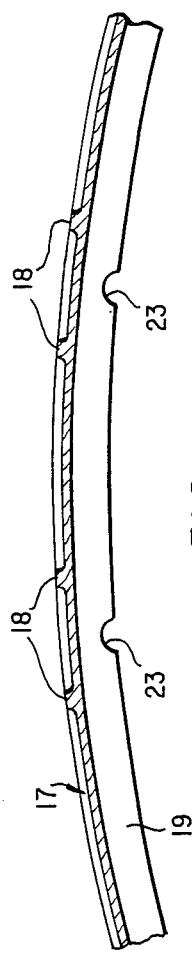
FIG. 6 is a section along the line VI—VI in FIG. 4.

The two end edges 9b which extend the width of the frame 9 are rectilinear and have holes 10 by which the assembled panel 6 can be secured by screws 11 to the inside wall 12 of the outer casing 13 for the cold flow of a by-pass jet engine (as shown in FIG. 2). The end edges 9b are of imbricated form, such that one will overlap the adjacent edge of a consecutive panel in forming a sound insulating lining.

A number of transverse struts 14a and 14b are evenly distributed between the two longitudinal edges 9b of the frame 9. The central strut 14b is reinforced and has two apertured bosses 16 for receiving further screws 11 for fixing the panel 6 to the casing wall. Each of the other struts 14a has a thinned portion 15 defining between the inner skin 7 and the thinned portion a free space into which resilient tongues of the cell forming structure 8 can engage to fix the structure 8 to the skin 7 as described below.

Referring now to FIGS. 4 to 8, the cell defining structure 8 is formed by a thin sheet 17 of polymer resin (e.g. an elastomer) reinforced by two pairs of rigid transverse strips 18 and carrying longitudinal ribs 19 which are arcuately curved in the longitudinal direction. When the structure is attached to the inner skin 7 the free inner edges of the ribs 19 will engage the perforated skin 7 to form therewith mutually sealed resonant cavities.

Between each pair of transverse stiffening strips 18 the thin sheet 17 has a hollow moulded recess 20 from which a portion is cut out to leave two in-turned tongues 21 separated by a space "e".

The tongues 21, being formed from the hollow moulded recesses in the elastomeric sheet 17, have between them and the sheet a free space 22 which will receive, on assembly of the panel, the thinned portions 15 of the struts 14a of the stiffener frame 9 of the perforated skin 7 when the tongues are clipped under the thinned portions to attach the structure 8 to the skin 7. So that the assembly may be achieved, each rib 19 of the structure 8 has, in line with the recesses 20, cut-out parts 23 which form a passage for accommodating the struts 14a.

Finally, it should be noted that the stiffening frame 9 is given a more pronounced curvature than that given to the cellular structure 8, so that, on fitting the latter to the stiffening frame by means of the two pairs of tongues 21, the acoustic panel thus formed is subjected to a prestress which will ensure a good seal between the ribs 19 and the perforated skin, and thus a satisfactory operation of the resonant cavities. In addition it will reduce the vibrations which the acoustic panel may undergo in operation.

The panel as described above and shown in FIG. 3 comprises, after assembly, a stiffening frame supporting the perforated skin 7, and two cellular structures clipped end to end on the struts 14a by means of their tongues 21.

The invention also envisages sound insulating linings made up of a succession of panels 6 such as described above around the perimeter of a wall, it being possible to arrange the linings in the bypass duct of a jet engine as shown in FIG. 2, either upstream of the fan to reduce the noise of the fan 4 towards the front of the engine, or downstream of the fan to attenuate the noise 5 downstream of the engine.

The invention thus further encompasses, in a more general manner, aviation bypass jet engines comprising sound insulating linings such as described above on the inside of the outer casing of the bypass flow, or on the outer edge 24 of the intermediate casing (as shown in FIG. 2).

It goes without saying that in the latter case the curvature of the acoustic panels must be reversed so that the perforated skin is flush with the outer edge of the intermediate casing.

What is claimed is:

1. An acoustic panel for a sound insulating lining to be applied to a wall of a gas flow path, said panel comprising an inner skin provided with a multiplicity of perforations, an elongate stiffening frame bonded to said inner skin, said frame being arcuately curved in a longitudinal direction thereof and including transverse struts across a width portion of said frame, said struts having thinned portions at predetermined positions thereon, and a cellular structure mounted on said inner skin to define a plurality of resonant acoustic cavities for which said perforations of said inner skin form acoustic vents, said cellular structure comprising a ribbed skin wherein the ribs thereof extend in said longitudinal direction and are arcuately curved with a natural radius of curvature different from that of said inner skin, said ribbed skin having at least one pair of resilient tongues which slip under said thinned portions of said transverse struts of said frame to attach said ribbed skin to said inner skin whereby said ribs engage said inner skin to form said resonant cavities.

2. An acoustic panel according to claim 1, wherein said ribbed skin is formed by a thin sheet of polymer resin carrying said curved ribs, said thin sheet having hollow moulded recesses, and said recesses having cut-out portions to define said resilient tongues.

3. An acoustic panel according to claim 1, wherein said stiffening frame has a curvature greater than that of said ribbed skin in order to place a stress on said acoustic panel when fixing said ribbed skin to said frame.

4. An acoustic panel according to claim 1, wherein end edges of said frame extending across the width portion thereof are imbricated whereby end edges of adjacent panels will overlap each other in forming a sound insulating lining, said end edges having holes for receiving screws for fixing said panel to the wall of said gas flow path.

5. An acoustic panel according to claim 1, wherein said acoustic panel comprises a plurality of similar panels, said panels being arranged in succession to form a circular sound insulating lining, each of said panels having end edges of imbricated form overlapping with said end edges of adjacent panels.

6. An acoustic panel according to claim 5, wherein said sound insulating lining is attached to an inside portion of an outer casing of an aircraft bypass engine.

* * * * *

UNITED STATES PATENT AND TRADEMARK OFFICE
CERTIFICATE OF CORRECTION

PATENT NO. : 4,858,721

DATED : AUGUST 22, 1989

INVENTOR(S) : PASCAL J.M. AUTIE, et al

It is certified that error appears in the above-identified patent and that said Letters Patent is hereby corrected as shown below:

On the title page

The Assignee is incorrect, "Societe Nationale d'Etude et de Construction de Moteurs d'Aviation, 03, Pa.RIS; FRX" should be: --Societe Nationale d'Etude et de Construction de Moteurs d'Aviation, Paris, France--.

In the Abstract, line 6, change "via of" to --via--.

In column 1, line 62, change "lining" to --linings--.

In column 3, line 1, change "by-pass" to --bypass--.

In column 4, line 33, change "slip" to --clip--.

Signed and Sealed this

Eleventh Day of September, 1990

Attest:

HARRY F. MANBECK, JR.

*Attesting Officer*          *Commissioner of Patents and Trademarks*